United States Patent [19]

De Cleroq

[11] Patent Number: 5,295,894
[45] Date of Patent: Mar. 22, 1994

[54] DEVICE FOR REMOVING LIDS FROM HONEYCOMBS

[76] Inventor: Ludo De Cleroq, s.c. Mithras Templar c.v. Kasteel Beyaerdstraat 96, B-1120 Brussels, Belgium

[21] Appl. No.: 948,356

[22] Filed: Sep. 23, 1992

[30] Foreign Application Priority Data

Sep. 24, 1991 [DE] Fed. Rep. of Germany ....... 4131682
Apr. 22, 1992 [DE] Fed. Rep. of Germany ....... 4213156

[51] Int. Cl.$^5$ ............................................. A01K 59/02
[52] U.S. Cl. ..................................................... 449/54
[58] Field of Search .............................. 449/54, 55, 56

[56] References Cited

U.S. PATENT DOCUMENTS

| | | | |
|---|---|---|---|
| 1,523,963 | 1/1925 | Hodgson | 449/54 |
| 3,735,433 | 5/1973 | Smith | 449/54 |
| 4,307,479 | 12/1981 | Mertes et al. | 15/182 |

FOREIGN PATENT DOCUMENTS

| | | | |
|---|---|---|---|
| 259675 | 7/1912 | Fed. Rep. of Germany | 449/54 |
| 2253452 | 8/1975 | France | 449/54 |

*Primary Examiner*—Robert P. Swiatek
*Attorney, Agent, or Firm*—Hoffman, Wasson & Gitler

[57] ABSTRACT

The wax lids of honeycomb cells are removed by a rotating tool which is provided as a rotating, cylindrical brush with firm, flexibly deflectable bristles. The honeycomb, from which the lids are to be removed, is arranged within a guide support of a casing, within which the honeycomb is movable relative to the resilient tool, under pressure. The rows of bristles of the rotating brush preferably extend at an angle to the longitudinal axis of the brush body and are uniformly distributed across the surface of the brush body. This type of device can be part of a system for fully automatically removing lids from honeycombs, providing for the automatic feeding and discharging of honeycombs.

11 Claims, 6 Drawing Sheets

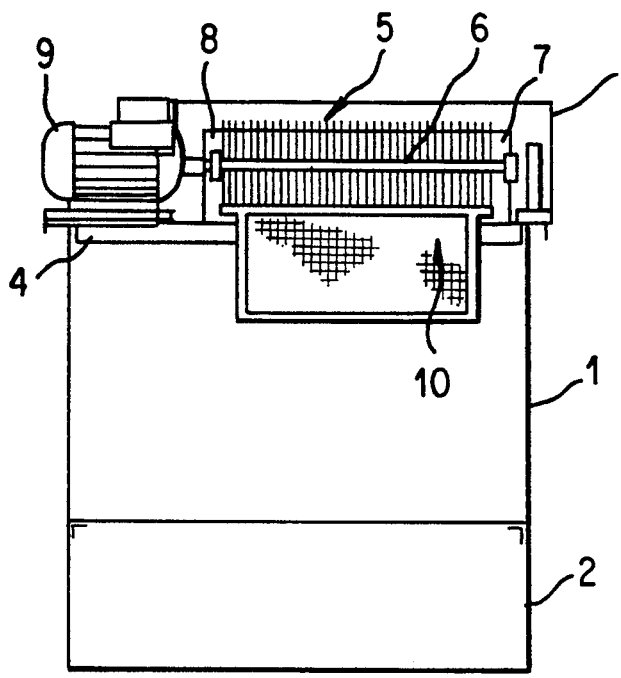
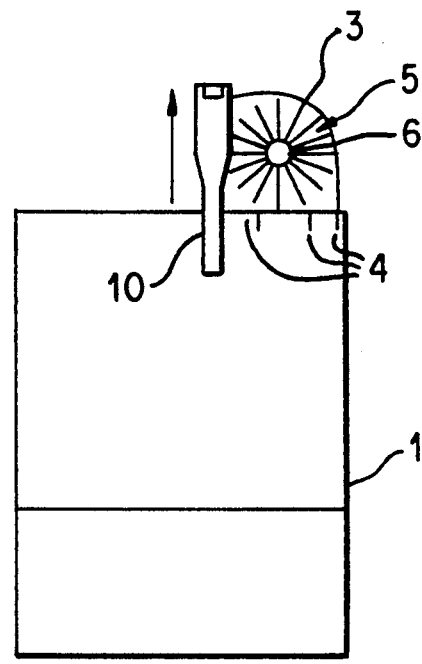
FIG. 1
FIG. 3
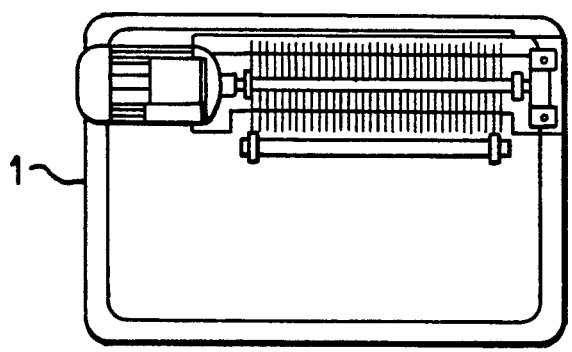
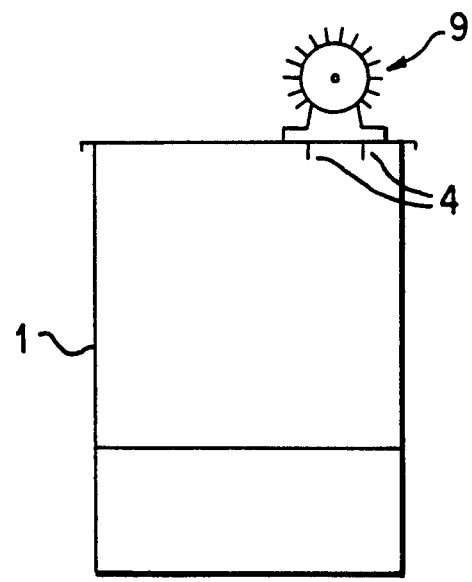
FIG. 2
FIG. 4

DEVICE FOR REMOVING LIDS FROM HONEYCOMBS

FIELD OF THE INVENTION

This invention refers to a device for removing the lids from closed cells of honeycombs by means of a rotating tool which engages and removes the lids from the honeycombs, and which together with the lidded honeycomb, is arranged within a casing.

BACKGROUND OF THE INVENTION

The cells of honeycombs which are filled by bees with honey and are closed by the bees with lids of natural wax are opened by removing or destroying the wax lid so that the honey can be extracted from the cells. Removing the wax lids is presently done either manually, by using removal instruments, such as removal forks, special knives or the like, which also can be electrically driven, or automatically by means of motor driven removal machines. Devices of this type are provided with electrically heated cutting edges and thermostats, in order to simplify the lifting of the lids of the cells by simultaneously melting and cutting, and obtaining a clean and smooth cutting area.

The step of removal is to be made in such a manner that, subsequent to the removal of the lids, the honeycombs can be introduced into corresponding centrifuges or similar machines for straining the honey without the necessity of any further operation steps. The time for removal of the lids is to be kept as low as possible, and the actual step of removal is to be performed in such a manner that no finishing operation will be required.

A known device for removing the wax lids closing the cells of the honeycomb uses a rotating cylinder with beating knives made from a metallic metal which are flyingly supported on the cylinder in order to cut off the wax lids from the surface of the honeycomb. The honeycomb to be released from the lids is arranged within a slide carriage and is automatically moved downward passing the rotating beating knives. The distance of the comb surface of the comb lids from the rotating beating knives is fixed, and determines the depth of removal of the lids, which depth is adjustable between approximately 20 mm and 45 mm.

This type of lid removal device including flying beating knives has considerable disadvantages for removing honeycomb lids. For example, since the surface of the lidded honey cells often is not uniformly plane but contains irregular bosses and indentations, it is impossible, in view of the fixed distance between the comb and the rotating beating knives, to avoid bossed surface areas of the honeycomb from being removed or cut too deep, and that from lower portions, the lid will not be removed sufficiently, or not at all. In this manner it is necessary to finish the honeycombs from which the lids are removed by machine by a manual operation which considerably increases the time and cost of the operation.

A further substantial disadvantage of these types of lid removal devices is that the metallic rotating beating knives cause damage on the rather soft wax cells, by smearing the opening of the cells. This is especially true when removing lids from plastic honeycombs since the full height of the cell walls are made from plastic material and, with this type of rotating beating knives, damaging of the rims of the cell openings cannot be avoided.

It has also been proven as being disadvantageous that due to the threat of accident with the metallic rotating beating knives, the lidded honeycombs cannot be manually pressed against the rotating beating knives in order to remove the wax lids either completely or partly for obtaining a finish, although the lidded honeycombs are to be positioned within the slide carriage. Adjusting the slide carriage in view of the beating knives is to be continually controlled every time the distance between the lids and beating knives alters. This would result in a time consuming finishing operation.

SUMMARY OF THE INVENTION

It is an object of this invention to provide a device for removing lids from lidded honeycombs which avoid the disadvantages of the aforementioned lid removal devices, especially the use of metallic beating knives, and which allow removal of the lids from the cells of honeycombs in an optimum manner, without damaging the wax cells or the comb material at all.

It is a further object of this invention to provide devices which can be used for removing the lids of lidded plastic honeycombs without any danger of damaging the rims of the cell openings, and which act upon the comb as smoothly uniformly as possible without any beating effect.

According to the subject invention, these objects are solved by providing a rotating cylindrical brush removal tool with firm, flexible bristles. A motor driven brush according to this invention, consists of a cylindrical drum with radially extending bristles which preferably are made of extremely high wear-resistant plastic material suitable for foodstuff, and which are firmly connected to the cylinder. The bristles can be mounted in parallel, axial rows, can be staggered in view of each other, or can be spirally extended around the cylindrical periphery or the like. Nylon, rilsan, polyimide or aramide have proven to be suitable materials for the bristles. However, this invention does not exclude the use of other plastic materials or materials which are similar to plastics, from which flexible bristles for corresponding cylindrical brushes can be made.

The thickness of the bristles can be between 0.1 and 3 mm in diameter, and the visible length of the bristles is approximately from 15 mm to 100 mm. The dimensions of the bristles are dependent on the rotational speed of the cylinder brush which is between approximately 750 and 6000 rotations per minute. The diameter of the cylinder without the bristles is, for example, between 30 mm and 120 mm, whereas the cylindrical brush with bristles has a diameter from approximately 60 mm to 350 mm.

Preferably, the rows of bristles of the rotating cylindrical brush are arranged on the body surface of the brush in a uniform manner extending at an angle to the longitudinal axis of the body. The rows of bristles can be arranged in a spiral form or an arrow form along the longitudinal axis.

The bristles of the brushes are preferably arranged in parallel, axial rows. This causes a considerable amount of striking force onto the brush moving over the lids of the honeycomb because of the resistance of the leading edge of the lid. Therefore, since the rotation of the brush will be delayed, it would pass over the lid with the stored energy, thereby releasing the bristles and the kinetic energy stored therewithin when leaving the lid, until the brush will hit the next lid. Consequently, the unlidding operation is discontinuous and unsteady from cell to cell so that repeatedly small beating effects will act upon the honeycomb which are not suitable for an exact removal of the lids, and which would also make it difficult to guide the honeycomb with respect to the tool in an exact manner.

According to this invention the beating forces provided by rows of bristles extending parallel to the longitudinal axis of the brush can be cancelled and a continuous and smooth removal of the lids can be obtained if the bristles of succeeding rows are staggered uniformly in the peripheral direction so that the individual bristles or bundles of bristles can perform their wipe-off effect continuously without any discontinuities. This allows, on the one hand, to remove the lids uniformly and, on the other hand, to guide the combs in their operation position in a simple and exact manner.

By using the bristles in this manner with rather high rotational speeds of approximately 3000 rotations per minute, a pumping effect within the bristle arrangement of the brush is obtained, which has the effect that air is sucked in from the sides allows any honey drops from the interior of the cells to flow along the bristles radially outwardly.

The cylindrical brush is driven by an electric motor supported in bearing brackets, which run in ball bearings. The brush and the motor are mounted on a high quality steel profile frame which is combined with the collecting reservoir for the wax lids and the honey from the honeycombs.

With the simplest embodiment of the device, according to this invention, the honeycombs are urged manually against the rotating cylindrical brush for removing the lids and are moved slowly relative to the brush in a tangential direction. The removed lid particles will be thrown upwardly against a transparent cover or they fall downwardly into the reservoir.

If the speed of the automatic removal of the lidded honeycombs is to be increased (compared with manual operation), the honeycombs are inserted into a slide carriage or a movable guide frame, which is moved toward the rotating cylindrical brush. This slide carriage is arranged within the device in such a manner that it is guided together with the honeycomb relative to the frame, or the frame is releasably guided relative to the carriage so that the upper side of the honeycomb including the lids is urged manually toward the area of effect of the rotating brush sections of the surface of the comb so that the irregular comb surface can be positively treated based upon their particular irregularities.

For a substantially higher speed of output of the honeycombs, a fully automatic lid removal system can be used. This removal system comprises a conveyor which receives the lidded honeycombs and transports them to a transfer station at which time the honeycombs are transmitted to a comb carousel, such as a rotating conveyor, a rotating chain or the like, which serially passes the individual honeycombs through a lid removal station. This station includes two oppositely arranged cylindrical brushes which work together onto, and engage opposite sides, of each individual honeycomb, thereby removing the lids. From this lid removing station, the honeycombs from which the lids have been removed are passed in a continuous operation, onto a discharge station, at which place the honeycombs are loaded onto an output conveyor so that a continuous and fully automatic operation for removing the lids is obtained.

BRIEF DESCRIPTION OF THE DRAWINGS

FIG. 1 is a schematic front view of a device according to the invention;

FIG. 2 is a plan view of the device according to FIG. 1;

FIG. 3 is a right side view of FIG. 1;

FIG. 4 is a left lateral view of FIG. 1;

DETAILED DESCRIPTION OF THE INVENTION

Figure 5:
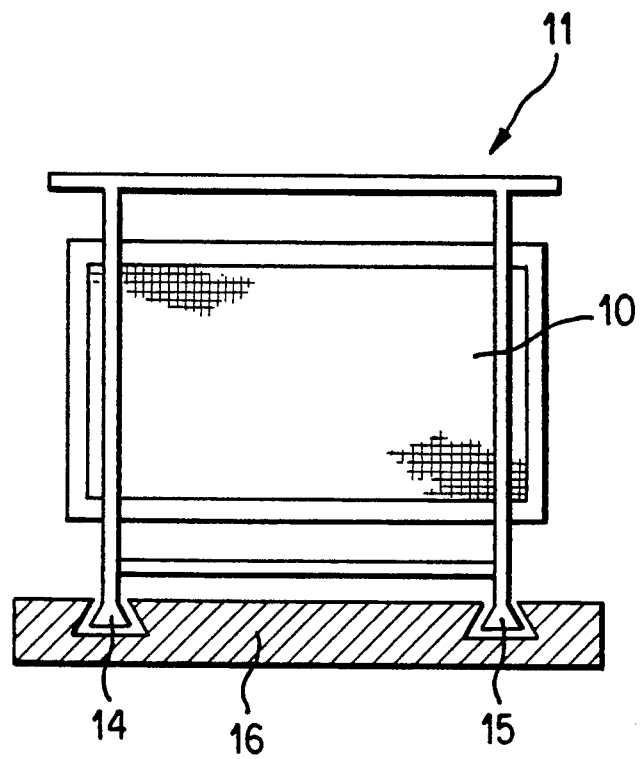
FIG. 5 is a schematic front view of a guide frame for the honeycomb from which the lids are to be removed.

As shown in FIGS. 1-4, a frame casing 1 at its lower area has a trough 2 for obtaining the removed lids of wax and honey as well as a preferably transparent upper cover 3. The casing 1 is closed at its upper end by means of a profile frame 4 made from high quality steel. The frame 4 supports the lid removing device, namely the rotating brush 5, the shaft 6 of which is supported in bearing pedestals 7, having ball bearings 8. A motor 9 driving the brush 5 is also included in the frame 4. A comb 10, from which the lids are to be removed, is moved to the brush 5 in such a manner that the brush 5, with its vertical upward and downward movements, engages that side of the comb 10 including the lids, in such a manner that due to the rotation of the brush, the bristles move elastically under pressure over the lids of the comb, and thereby crush and destroy the wax lids. The kinetic energy of the elastically deformable bristles of the brush is sufficient to remove the rather soft wax of the lids, but is not strong enough to destroy the more solid parts of the comb, for example, the frame portions made from wood or plastics material, or in case of plastic honeycombs the plastic material itself. Furthermore, if the brush engages the hand of a person working with the machine, injuries would not likely result. The comb 10 from which the lids are to be removed is manually moved upward and downward, and is urged against the brush so that the bristles of the rotating brush destroy and remove the wax material of the lids.

Figure 6:
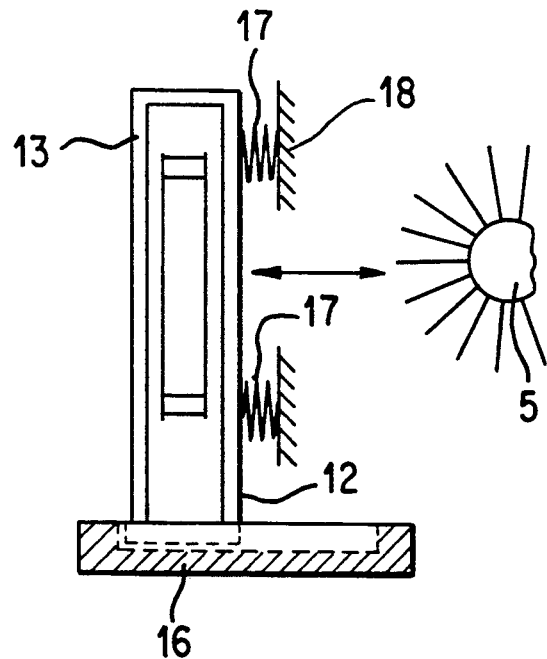
FIG. 6 is a lateral view of FIG. 5.

The embodiment shown in FIGS. 5 and 6 includes a honeycomb 10 which is not moved manually along the brush 5, but rather moves by means of a guide frame. A frame rack 11 is provided within which the honeycomb 10 is arranged to facilitate the upward and downward movement. The frame rack 11 consists of a front and a rear frame portion 12 and 13 which consist of rods and which are connected at the top and the bottom end with each other, leaving sufficient room for enabling the insertion of the honeycombs 10. The frame rack 11 is provided with feet 14, 15 which are movable along longitudinal guides 16 so that the frame rack 11, together with the honeycomb 10, is movable relative to the brush 5. The lateral portions of the frame rack 11 are provided with springs or flexible elements 17 which are in contact with stationary stops 18 so that, by pressure on the honeycomb 10 and the frame rack 11, the honeycomb 10 and the frame 11 can be moved closer to the brush 5, so that the effect of the bristles onto the wax lids of the honeycomb 10 is amplified.

Figure 7:
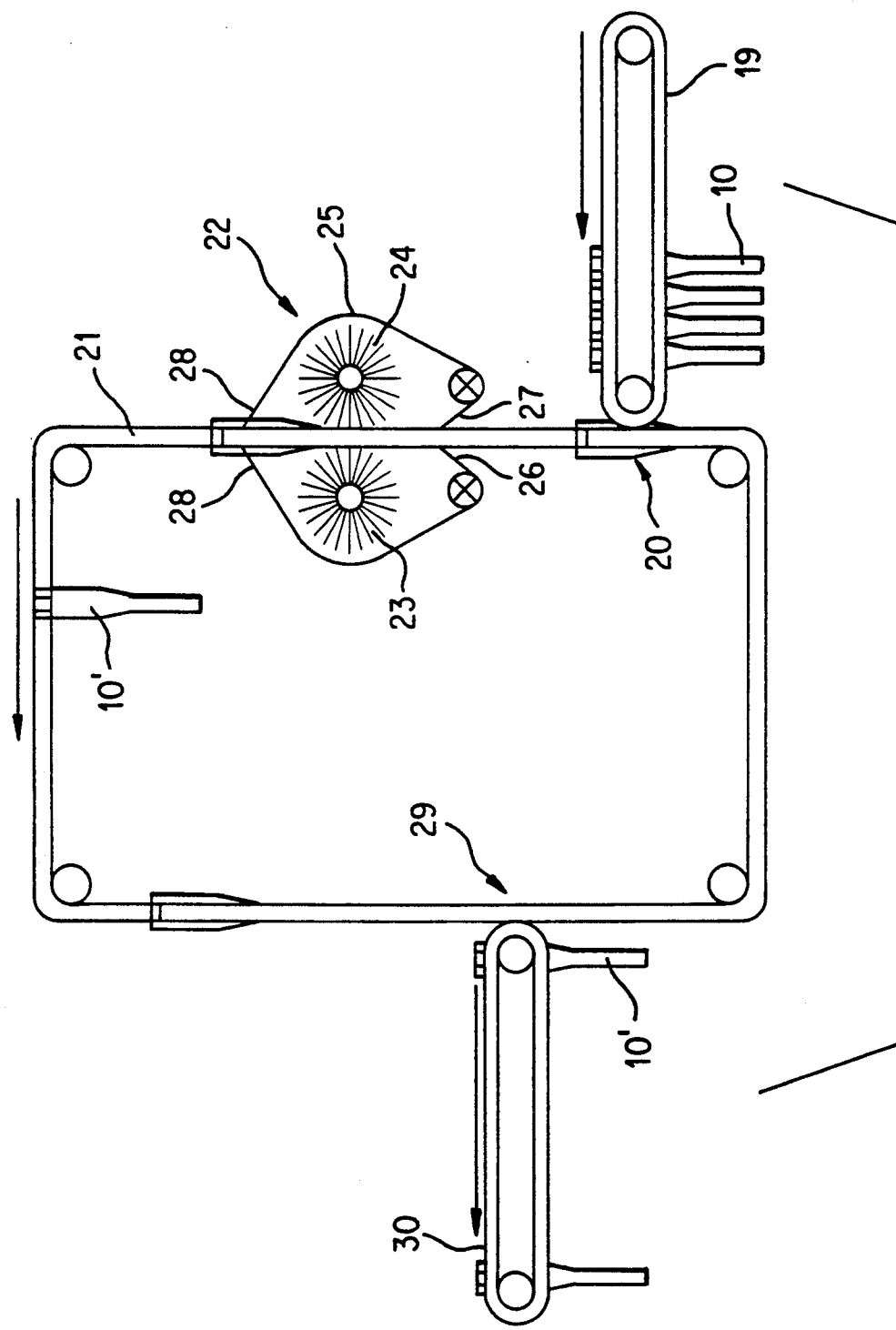
FIG. 7 is a schematic view of a fully-automatic lid removing system.

With an automatically operating system according to FIG. 7, a plurality of honeycombs 10 is transferred through a feeding conveyor 19 to a transfer station 20 and then to a rotating conveyor 21, such as a carousel from which the individual honey combs are transported through a lid removing device 22 for having the lids removed. The device 22 consists of two cooperating brushes 23, 24 which at the same time act upon both sides of the honeycomb 10, a casing 25 surrounding the brushes, and sealing flaps 26, 27 at the lower end of the casing 25 which seal the casing around the rotating conveyor 21. Corresponding sealing devices 28 are provided at the discharge end of casing 25. A honeycomb 10' from which the lid has been removed is carried within the rotating conveyor to a discharge station 29 and is delivered onto a discharge conveyor 30, from where the lidless honeycombs can be dispensed. A trough 31 is provided below the entire device, within which the removed lids and any honey exiting from the honeycombs will be collected. The conveyor 19 and the conveyor 30 can be arranged for temporary storage or can be coupled to a temporary storage which will be able to receive a plurality of honeycombs in order to facilitate the automatic operation of the feeding and discharging of honeycombs.

Figure 9:
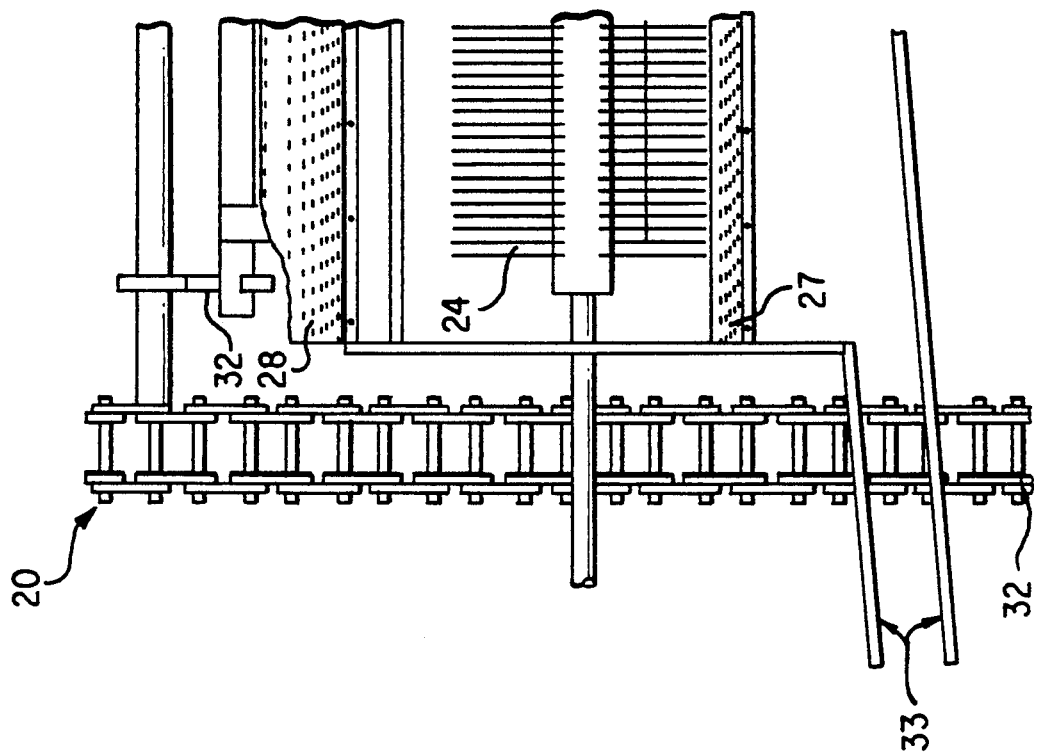
FIG. 9 is a cross-sectional view of FIG. 8 along I—I.
Figure 8:
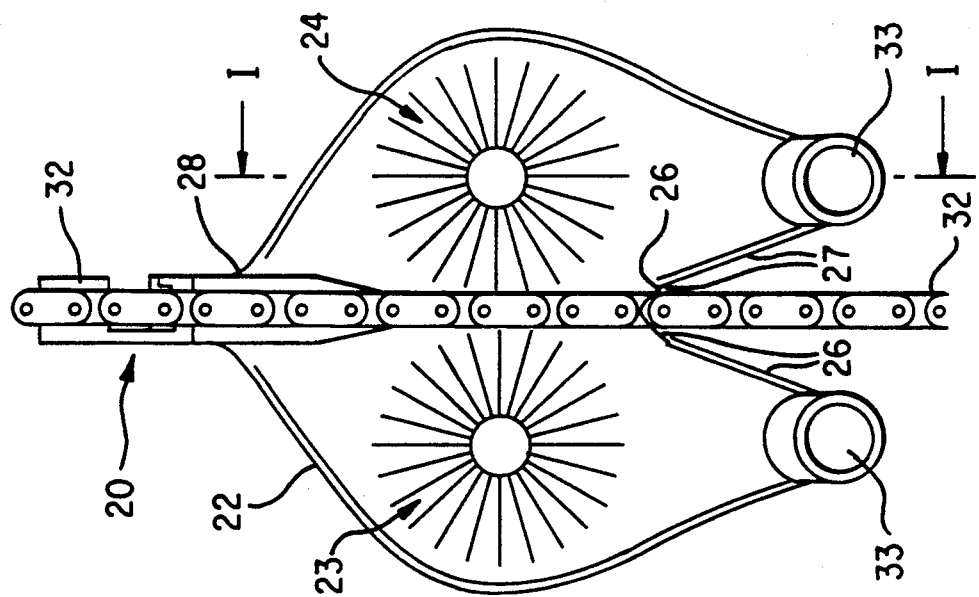
FIG. 8 shows the lid removing system according to FIG. 7 in more detail.

FIGS. 8 and 9 show a detailed embodiment of the lid removing system shown in FIG. 7. The rotating conveyor 20 or alternatively the carousel is arranged as a chain conveyor, onto which comb transport hooks are fastened. The casing 25 is provided with discharge channel 33 through which the destroyed wax lids are removed from the interior of the casing 25.

Figure 10:
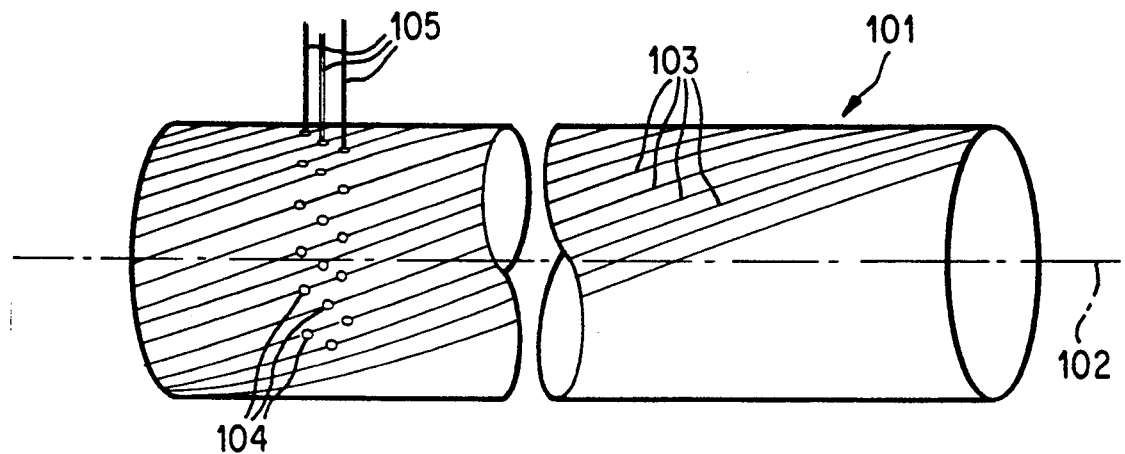
FIG. 10 is a perspective view of an embodiment of a brush according to the invention.

As shown in FIG. 10, the brush body 101 is in the shape of a cylinder with a central longitudinal axis 102. At its periphery in rows 103, recesses 104 are provided for taking up the bundles of bristles. According to FIG. rows of bristles are arranged at an inclined angle to the longitudinal axis 102, which angle α is between 7° and 50°, preferably 30°. The rows of bristles extend parallel to each other from one front side to the opposite front side of the body 101 of the cylinder. The bristle bundles 105 are staggered in the peripheral direction, one behind the other, at a distance of approximately 6 to 8 mm to each other. The distance X between two adjacent rows 103 of the bristle bundles is approximately 4 mm. The diameter of the cylindrical body of the brush can be 30 mm, the length of the brush can be 460 mm, the extension of the bristles beyond the surface of the brush body can be 60 mm and the thickness of the bristles is 0.7 mm.

Figure 11:
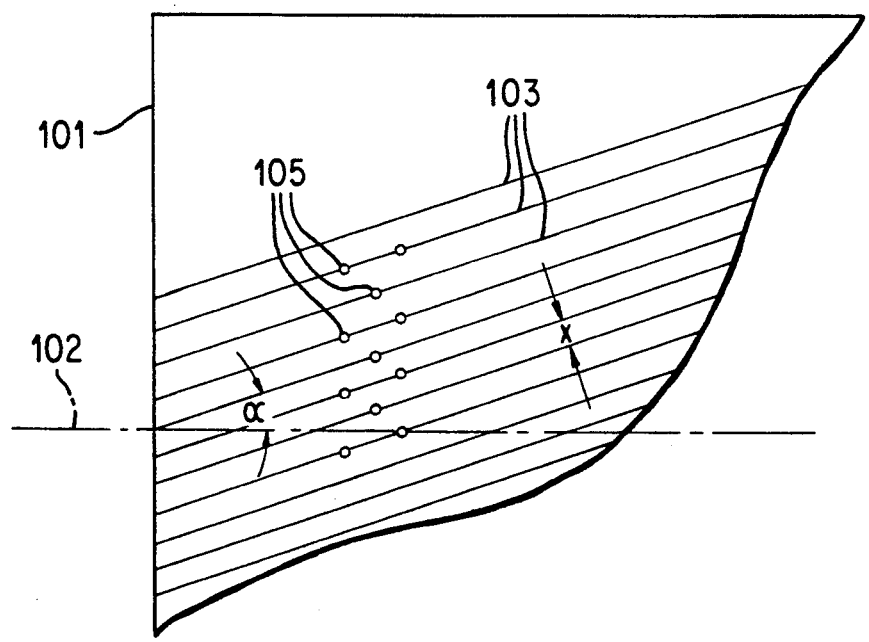
FIG. 11 is a development of the brush according to FIG. 10.
Figure 12:
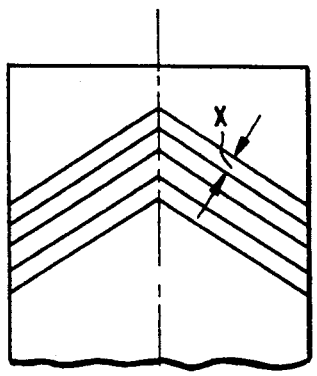
FIGS. 12-16 are different embodiments of rows of the brush according to the present invention.
Figure 13:
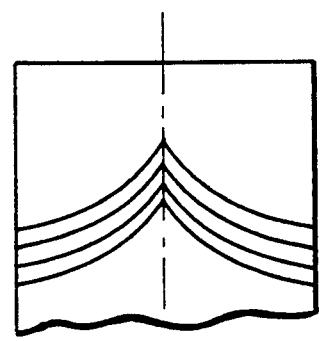
Figure 14:
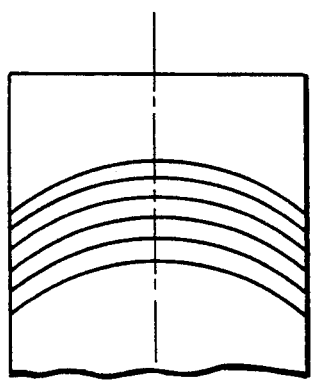
Figure 15:
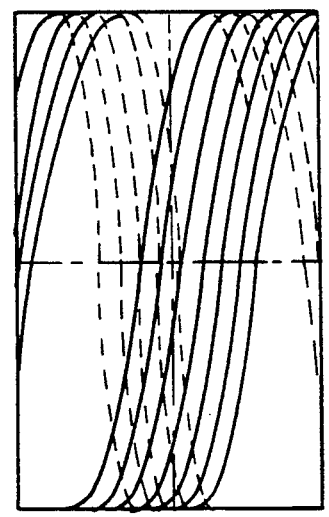
Figure 16:
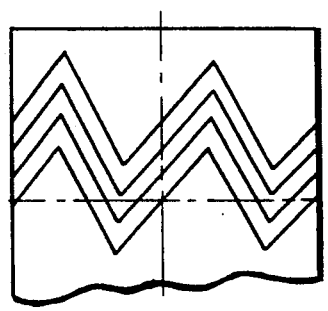

The embodiments shown in FIGS. 12, 13, 14, 15 and 16 are cut-outs from schematic developments of the cylindrical area of different varieties of bristle rows according to the invention. The rows of bristles are either in straight lines or are curved. However, both of these embodiments are dimensioned according to the criteria of the pictures of FIGS. 10 and 11.

The rows of bristles are not required to be continuously arranged over the entire periphery of the brush surface, and several adjacent brush rows are separated from unoccupied bristle rows or alternatively surface portions. For example, several bristle rows, preferably between three and six adjacent rows, can be distributed over the brush surface staggered by 90° so that, for example, four groups of brush rows each can have a distance of about 90° from each other in peripheral direction. Similarly, the embodiments according to FIGS. 12-16 each form such groups of bristle rows.

What is claimed is:

1. A device for removing wax lids from honeycomb cells, comprising:
   a frame casing;
   a support device provided on top of said frame casing;
   a rotatable cylindrical brush supported by said support device for rotation thereon and for engaging and removing the lids from the honeycomb cells, said brush provided with firm, flexible bristles constructed from a high wear-resistant plastic material, said bristles arranged in a plurality of rows, each row provided at an inclined angle to the longitudinal axis of said brush, said bristles being uniformly distributed across the peripheral surface of said brush; and
   a trough provided below said frame casing for receiving the removed lids.

2. The device in accordance with claim 1, wherein said plastic material is nylon.

3. The device in accordance with claim 1, wherein said plastic material is rilsan.

4. The device in accordance with claim 1, wherein said plastic material is a polyimide.

5. The device in accordance with claim 1, wherein said plastic material is an aramide.

6. The device in accordance with claim 1, wherein said rows of bristles are arranged in spiral lines.

7. The device in accordance with claim 1, wherein said rows of bristles are arranged in a herringbone pattern.

8. The device in accordance with claim 1, wherein individual groups of bristles of two adjacent rows of bristles are staggered in the rotational direction with respect to one another.

9. The device in accordance with claim 1, wherein two adjacent rows of bristles are 4 mm apart.

10. The device in accordance with claim 1, wherein the angle between each row of bristles and the longitudinal axis of the brush is between 7° and 50°.

11. An apparatus for automatically removing wax lids from honeycomb cells, comprising:
   a lid removing device provided with at least one rotatable brush, said rotatable brush provided with bristles constructed from a high wear-resistant plastic material, said bristles arranged in a plurality of rows, each row provided at an inclined angle to the longitudinal axis of said brush, said bristles being uniformly distributed across the peripheral surface of said brush;
   a rotating conveyor for moving the honeycomb cells past said lid removing device;
   a feeding conveyor for transporting the honeycomb cells to said rotating conveyor, said feeding conveyor also temporarily storing said honeycombs, said rotating conveyor being a closed loop carousel which transports the individual honeycomb cells in an upright, downwardly extending position; and
   a discharge conveying means associated with said rotating conveyor for removing the honeycomb cells.

* * * * *